(12) United States Patent
Zeng (10) Patent No.: US 12,216,718 B2
(45) Date of Patent: Feb. 4, 2025

(54) DOCUMENT PROCESSING METHOD AND APPARATUS, AND ELECTRONIC DEVICE

(71) Applicant: BEIJING ZITIAO NETWORK TECHNOLOGY CO., LTD., Beijing (CN)

(72) Inventor: Qing Zeng, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/334,093

(22) Filed: Jun. 13, 2023

(65) Prior Publication Data
US 2023/0325443 A1    Oct. 12, 2023

Related U.S. Application Data

(63) Continuation of application No. PCT/CN2021/138492, filed on Dec. 15, 2021.

(30) Foreign Application Priority Data

Dec. 15, 2020    (CN) .......................... 202011490102.8

(51) Int. Cl.
*G06F 16/93* (2019.01)
*G06F 16/901* (2019.01)
(Continued)

(52) U.S. Cl.
CPC .......... *G06F 16/94* (2019.01); *G06F 16/9024* (2019.01); *G06F 16/9558* (2019.01); *G06F 21/6209* (2013.01); *G06F 2221/2141* (2013.01)

(58) Field of Classification Search
CPC .. G06F 16/94; G06F 16/9558; G06F 21/6209; G06F 2221/2141; G06F 16/90; G06F 40/20; G06F 40/30; G06F 16/9024
See application file for complete search history.

(56) References Cited

U.S. PATENT DOCUMENTS

| 6,189,019 B1* | 2/2001 | Blumer | G06F 16/954 |
| | | | 707/999.102 |
| 2008/0133404 A1* | 6/2008 | Bascom | G06F 16/289 |
| | | | 707/999.103 |

(Continued)

FOREIGN PATENT DOCUMENTS

| CN | 103412921 A | 11/2013 |
| CN | 106682219 A | 5/2017 |

(Continued)

OTHER PUBLICATIONS

International Search Report (with English translation) and Written Opinion issued in PCT/CN2021/138492, dated Mar. 9, 2022, 11 pages provided.

(Continued)

*Primary Examiner* — Sanchita Roy
(74) *Attorney, Agent, or Firm* — Astute UP Law Group (57) ABSTRACT

A document processing method and apparatus, and an electronic device are provided. The method comprises: determining a target document; and displaying document information of an associated document on the basis of an association relationship between the target document and the associated document, wherein the document information of the associated document comprises a first document having a first reference relationship with the target document, and/or a second document having a second reference relationship with the target document, the first reference relationship indicates that the associated document refers to the target document, and the second reference relationship indicates that the target document refers to the associated document.

20 Claims, 3 Drawing Sheets

(51) Int. Cl.
*G06F 16/955* (2019.01)
*G06F 21/62* (2013.01)

(56) References Cited

U.S. PATENT DOCUMENTS

| | | | | |
|---|---|---|---|---|
| 2013/0226947 | A1* | 8/2013 | Bascom | G06F 16/288 |
| | | | | 707/758 |
| 2014/0304579 | A1* | 10/2014 | Foster | G06F 3/0481 |
| | | | | 715/205 |
| 2017/0039171 | A1* | 2/2017 | Tashiro | G06F 40/279 |
| 2022/0027553 | A1* | 1/2022 | Xu | G06F 40/157 |

FOREIGN PATENT DOCUMENTS

| | | | |
|---|---|---|---|
| CN | 109684613 | A | 4/2019 |
| CN | 110134800 | A | 8/2019 |
| CN | 111858518 | A | 10/2020 |
| CN | 112528595 | A | 3/2021 |
| JP | H08-129544 | A | 5/1996 |
| JP | H08-161214 | A | 6/1996 |
| JP | H11-184687 | A | 7/1999 |
| JP | 2000099543 | A | 4/2000 |
| JP | 2000305880 | A | 11/2000 |
| JP | 2006120016 | A | 5/2006 |
| JP | 2006146905 | A | 6/2006 |
| JP | 2009223717 | A | 10/2009 |
| JP | 2017174319 | A | 9/2017 |

OTHER PUBLICATIONS

Office Action issued in CN202011490102.8, mailed Nov. 25, 2021, with English translation, 26 pages provided.
Office Action for Japanese Patent Application No. 2023-536065, mailed on Sep. 3, 2024, 14 pages.

* cited by examiner

DOCUMENT PROCESSING METHOD AND APPARATUS, AND ELECTRONIC DEVICE

CROSS REFERENCE OF RELATED APPLICATION

This application is a continuation of International Patent Application No. PCT/CN2021/138492 filed on Dec. 15, 2021, which claims priority to Chinese Patent Application No. 202011490102.8, titled "DOCUMENT PROCESSING MEHTOD AND APPARATUS, AND ELECTRONIC DEVICE", filed on Dec. 15, 2020 with the China National Intellectual Property Administration (CNIPA), both of which are incorporated herein by reference in their entireties.

FIELD

The present disclosure relates to the technical field of computers, and in particular to a document processing method, a document processing apparatus and an electronic device.

BACKGROUND

With development of the Internet, a user browses information preferably by terminal devices. For example, the user may share an on-line document to other users, and allocates an access and/or editing permission for other users, so that other users may edit the same document simultaneously. In addition to the editing function, the user may refer to another document in one document, thereby achieving document indexing.

SUMMARY

This section is provided to introduce the concept briefly, and the concept is described in detail in specific embodiments hereinafter. This section is neither intended to identify key features or necessary features of the claimed technical solutions, nor intended to limit scope of the claimed technical solutions.

In a first aspect, a document processing method is provided according to embodiments of the present disclosure. The method includes: determining a target document; and displaying, based on an association between the target document and an associated document, document information of the associated document, where the document information of the associated document includes a first document having a first reference relationship with the target document, and/or a second document having a second reference relationship with the target document; the first reference relationship indicates that the associated document refers to the target document, and the second reference relationship indicates that that target document refers to the associated document.

In a second aspect, a document processing apparatus is provided according to embodiments of the present disclosure. The apparatus includes: a determining unit and a display unit. The determining unit is configured to determine a target document. The display unit is configured to display, based on an association between the target document and an associated document, document information of the associated document, where the document information of the associated document includes a first document having a first reference relationship with the target document, and/or a second document having a second reference relationship with the target document; the first reference relationship indicates that the associated document refers to the target document, and the second reference relationship indicates that that target document refers to the associated document.

In a third aspect, an electronic device is provided according to embodiments of the present disclosure. The electronic device includes: one or more processors; and a storage apparatus configured to store one or more programs. The one or more programs, when being executed by the one or more processors, cause the one or more processors to implement the document processing method according to the first aspect.

In a fourth aspect, a computer readable medium storing computer programs is provided. The computer programs are executed by a processor to implement the method according to the first aspect.

With the document processing method, the document processing apparatus and the electronic device according to the embodiments of the present disclosure, the associated document of the target document is displayed based on the document information, so that documents having the association with the target document can be displayed in a centralized manner, thereby improving an efficiency for viewing the associated document by a user.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
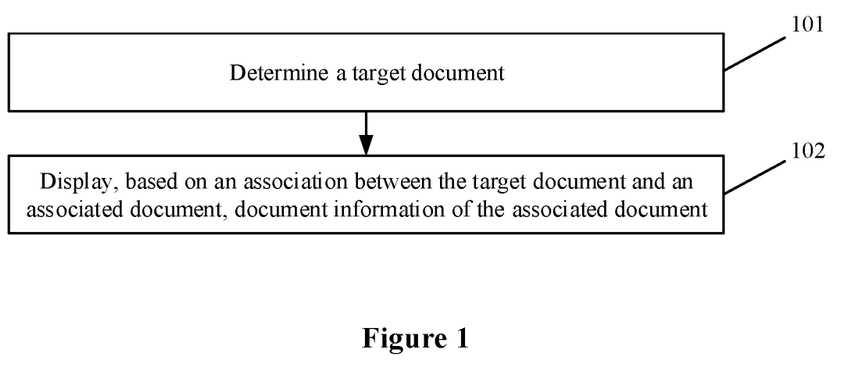
FIG. 1 is a flowchart of a document processing method according to an embodiment of the present disclosure.

Reference is made to FIG. 1 which shows a flowchart of a document processing method according to an embodiment of the present disclosure. The method includes steps 101 and 102.

In step 101, a target document is determined.

In the embodiment, a performing subject of the document processing method (for example a terminal device) may determine the target document.

The determined target document may be any online document here. It should be understood that the target document is only used for description, and is not intended to limit the online document.

In an embodiment, the target document may be determined in response to a user operation. A type and a function of the user operation are not limited herein.

For example, the user operation may include but not limited to at least one of: opening an on-line document, performing page turning in the on-line document and triggering associated document viewing control.

In step 102, based on an association between the target document and an associated document, document information of the associated document is displayed.

The document information of the associated document includes: a first document having a first reference relationship with the target document, and/or a second document having a second reference document with the target document.

For example, the document information may be displayed in a list.

The associated document may be a document having a reference relationship with the target document herein.

In an example, a document A may refer to a document B, and a document C may refer to the document A. In this case, both the document B and the document C may server as associated documents of the document A.

The first reference relationship indicates that the associated document refers to the target document. For example, the target document A may be referred to by the document C, and the document C is an associated document of the target document A. A relationship between the associated document C and the target document A is the first reference relationship.

The second reference relationship indicates that the target document refers to the associated document. For example, the target document A may refer to the document B, and the document B is an associated document of the target document A. A relationship between the associated document B and the target document A is the second reference relationship.

Content and forms of the associated document included in the document information of the associated document may be set depending on actual application scenarios, and are not limited herein.

In an example, the document information may include related content of the associated document (for example a document identifier and a document comment amount).

In an example, the document information may include an associated document indicated by a picture, a table, a text and so on.

It should be noted that, according to the document processing method provided in the embodiment, the associated document of the target document is displayed based on the document information. In this way, documents having the association with the target document can be displayed in a centralized manner, thereby improving the efficiency of viewing the associated document by the user.

It should be noted that, the second document is displayed, that is, the associated document referring to the target document is displayed, information other than the target document is provided to the user, so that the user can view richer reference information related to the target document when browsing the target document. In this way, the user can know a using mode of the target document (that is, being referred to), so that the user manages the using of the target document, thereby improving normativity of the using of the target document.

In some embodiment, step 102 may include: displaying the document information of the associated document in the target document.

The document information of the associated document may be displayed at any position in the target document herein.

In an example, the document information of the associated document may be displayed at bottom of the online document.

It should be noted that, the document information of the associated document is displayed in the target document, so that the user browsing the online document conveniently obtains information of the associated document, thereby improving the efficiency of obtaining information by the user.

In some embodiments, step 102 may include: displaying the document information of the associated document in response to detecting a triggering operation on an associated document viewing control.

In some application scenarios, if the document has the associated document, a document identifier may be displayed together with the associated document viewing control in various scenarios of displaying the document identifier. If the user triggers the associated document viewing control, document information of the associated document may be displayed.

It should be noted that, the associated document control is displayed in response to the triggering operation on the associated document viewing control, so that the associated document information of the online document is displayed without opening the online document by the user. In this way, the operation of viewing the associated document information can be simplified, thereby reducing consumption of computing resources and display resources.

In some embodiments, the method further includes: establishing a document reference relationship between the target document and an associated document in response to detecting a document reference operation; and adding the associated document indicated by the established reference relationship in the document information of the associated document.

Implementations of the document reference operation may be set depending on actual application scenarios.

A relationship between documents can be generated in a timely manner by establishing the document reference relationship. In this way, the associated document referred newly can be displayed in a timely manner in the online document, thereby improving timeliness and accuracy of the displaying of the association between the documents.

In some embodiments, the document reference operation may include but not limited at least one of: inputting a preset reference symbol and a name of a reference document; triggering a document insertion control and determining the reference document; inserting a link of the reference document; and inserting content of the reference document being referred to.

In an example, the process of inputting a preset reference symbol and a name of the reference document may include mentioning a document by a symbol "@".

In an example, the process of triggering a document insertion control and determining the reference document may include inserting a document by adding a panel.

In an example, the process of inserting a link of the reference document may include inserting a document by pasting a link of the document.

In an example, the process of inserting content of the reference document being referred to may include pasting content of the reference document again in the target document for reference again.

It should be noted that, convenience of document reference can be improved with the above document reference manner, so that the user can quickly refer to the document.

In some embodiments, the document information includes first sub-information and/or second sub-information. The first sub-information is used to display a first document, and the second sub-information is used to display a second document.

In some embodiments, step 102 may include: in response to that there is an associated document having a reference relationship with the target document, displaying a document identifier of the associated document in sub-information corresponding to the associated document; or in response to there is no associated document having a reference relationship with the target document, displaying reference prompt information in corresponding sub-information.

In an example, the target document and the first document (for example the document C) have the first reference relationship, thus the first sub-information may be displayed.

In an example, the target document and the second document (for example the document B) have the second reference relationship, thus the second sub-information may be displayed.

In an example, neither the document having the first reference relationship with the target document nor the document having the second reference relationship with the target document exists, thus information of the associated document is not displayed.

In an example, if the first reference document exists but the second reference document does not exist, the first sub-information including the first document may be displayed, and reference prompt information is displayed in the second sub-information (for example, this document does not refer to other document, you can quickly refer to a document by inputting "reference operation").

In an example, if the second reference document exists but the first reference document does not exist, the second sub-information including the second document may be displayed, and reference prompt information is displayed in the first sub-information (for example, this document is not referred to by other document, you can quickly refer to a document by inputting "reference operation").

It should be noted that, the first document and the second document are displayed in different sub-information, different associated documents can be intuitively provided to the user, so that the user can know information of the associated document based on types, thereby improving the information obtaining efficiency of the user.

It should be noted that, if there exists at least one type of associated document, two pieces of sub-information is displayed, and reference prompt information is displayed in blank document information, so that the user is guided to perform operations related to reference, thereby improving using frequency of the target document and improving information interaction efficiency by document reference.

In some embodiments, the method further includes: in response to determining that the association is cancelled, deleting a document identifier corresponding to the cancelled association from the document information.

When the association between the target document and the associated document is cancelled, the document identifier is deleted from the document information, so that timely and accurate information can be presented for the user. The relationship cancelling may include deleting the referred document content from the corresponding document.

In some embodiments, the method further includes: updating the document information in response to a content modification operation on the associated document.

The document information of the associated document is updated timely when the content of the associated document is modified, thereby displaying accurate related information of the associated document in the document information.

In some embodiments, the process of updating the document information in response to a content modification operation on the associated document may include: updating the document identifier of the first document or the second document in the document information in response to a title modification operation on the first document or the second document.

If the title of the associated document (that is, the first document or the second document) is modified, the title of the associated document in the document information may be updated.

In this way, the document identifier in the document information can accurately indicate the associated document, so that the user can obtain accurate information of the associated document.

In some embodiments, in response to a related operation on a first reference text unit of the first document, the first reference text unit is updated in the document information.

The first text reference unit is a text unit referring to the target document in the first document.

If the first text reference unit is modified, the first text reference unit may be updated timely in the document information. In this way, the user can obtain accurate content of the reference unit from the first text reference unit presented in the document information.

In some embodiments, the method further includes displaying at least one of a comment amount and a reading amount corresponding to the associated document. The comment amount includes at least one of a like amount and a word comment amount.

There exist various types of information displayed for the associated document.

In an example, the displayed information may include a comment amount. The comment may include expressing like or writing specific comment words. The displayed information may further include a reading amount which may indicate the number of times of reading the associated document.

It should be noted that, the information of the associated document, such as the comment amount or the reading amount, is displayed, so that richer reference information of the associated document can be provided for the user, thereby improving the information obtaining efficiency of the user.

In some embodiments, the method may further include: in response to a first permission control operation on the associated document, setting an access permission of the target document for an access user of the first document.

The first permission control operation may be implemented in various manners. In an example, a first permission setting panel for the first document may be displayed based on the first document in the document information. A current user may operate the first permission setting panel to set an access permission of the target document for the access user of the first document.

In this way, the access permission can be set quickly in a unified manner, thereby being convenient for the access user of the first document to access the target document.

In some embodiments, the method may further include: in response to a second permission control operation on the associated document, applying for or setting an access permission of the second document for an access user of the target document.

The second permission control operation may be implemented in various manners. In an example, a second permission setting panel of the second document may be displayed according to the second document in the document information.

In an embodiment, a current user may operate the second permission setting panel to apply for an access permission from an owner of the second document for an access user of the target document.

In an embodiment, the current user may operate the second permission setting panel to set an access permission of the second document for the access user of the target document.

It should be noted that, if the current user has a permission for opening the access permission of the second document, the current user my set the access permission of the second document. If the current user has no permission for opening the access permission of the second document, the current user may apply for the access permission of the second document from other user. In this way, the current user can set or apply for the access permission in a unified manner for the access user of the target document, so that the access user of the target document can quickly access to the second document, thereby avoiding an operation that each access user of the target document applies for the access permission, and thus reducing calculation resources and communication resources consumed due to the applying for the access permission.

In some embodiments, step 102 may include: displaying a first document identifier.

The first document is a document referring to the target document.

In an embodiment, the first document identifier may include but not limited to at least one of a document name and a document icon.

In some embodiments, the method may further include: in response to detecting a triggering operation on the first document identifier, displaying the first document indicated by the triggering operation.

It should be noted that, the first document is displayed in response to the triggering operation on the first document identifier, so that the user can quickly view a document referring to the target document when viewing the first document information, thereby improving convenience of the operation.

In some embodiments, the method further includes: determining a display order of the first document identifier in the document information based on reference time.

In an embodiment, the process of determining the display order of the first document identifier based on reference time may include: arranging a first document identifier with earliest time at a foremost position in the document information of the associated document.

In an embodiment, the process of determining the display order of the first document identifier based on reference time may include: arranging a first document identifier with latest reference time at a foremost position in the document information of the associated document.

The reference time may indicate time when one document refers to another document. In a scenario of the first document, the reference time may indicate time when the first document refers to the target document.

It should be noted that, the display order is determined based on the reference time, so that the first document identifier is displayed according to time logic, thereby being convenient for the user to view and search.

In some embodiments, the reference time refers to time when the association with the associated document is established first, if the association is valid.

If the first document refers to the target document for multiple times, the reference time refers to time when the first document refers to the target document first. Time of the first reference is recorded when the first reference is deleted. That is, the time of the first reference serves as the reference time continuously, until the first document does not refer to the first document.

It should be noted that, the time when the association is established first is used as the reference time if the association is valid, so that an order of the first document in the document information does not change when a part of reference relationship of the first document to the target document is changed, thereby displaying the document information stably, reducing consumption of display resources, providing a stable display effect for the user and thus improving the information obtaining efficiency of the user.

In some embodiments, step 102 may include: displaying a first reference text unit.

The first reference text unit is a text unit in the first document referring to the target document.

The text unit may be set depending on actual application scenarios. In an example, the text unit may be a text line, a sentence or a paragraph.

In an embodiment, a document B is a first document of a document A. The document B includes a line of words "for an operation manner, please refer to the document A". The line of words may be displayed in the document information of the associated document.

It should be noted that, in the scenario of the first document, the first reference text unit is displayed, so that the user can know text content of the target document being referred to without opening the first document by the user, thereby being convenient for the user to determine whether to jump and display the first document.

In some embodiments, if there exists no configuration text when the first document refers to the target document, the first reference text unit is not displayed. That is, the document identifier when the target document is inserted into the first document is displayed, and the display text is not configured.

The first document refers to the target document for multiple times. The process of displaying the first reference text unit includes: determining a display order of the first reference text unit in the document information of the associated document based on a ranking of the first reference text unit in the first document.

The first document may refer to the target document for multiple times. In this case, the first reference text unit is displayed based on the ranking of the first reference text unit in the first document.

The first reference text unit in the document information may be ranked from left to right or from top to bottom.

In an example, the first reference text unit is ranked based on an absolute value of a line number of the first reference text unit in the first document. The first reference text unit is displayed in the document information according to a ranking result, that is, the first reference text unit is displayed from left to right or from top to bottom based on the ranking result.

In an embodiment, when the target document is referred to for multiple times in a table, the first reference text unit is displayed based on a table number or displayed from left to right of the table or from top to bottom of the table.

It should be noted that, multiple first reference text units in the first document are ranked in an order, so that the user conveniently obtains content of each of the first reference text units. In addition, the first reference text units are ranked in an order, so that the user can know general content and general logic of the first document, thereby improving the efficiency of obtaining related information of the first document by the user.

The process of displaying the first reference text unit includes: determining the number of words in the first reference text unit according to a preset display word number threshold.

It should be noted that, a part of the first document referring to the target document may contain many words. In this case, according to the preset display word number threshold, the first reference text unit with an appropriate number of words is obtained, thereby ensuring that the number of words in the first reference text unit displayed in the document information is not excessive, and thus avoiding occupying a larger display region.

In some embodiments, the method further includes at least one of: in response to detecting a triggering operation on the first reference text unit, opening a first document and jumping and displaying a first reference text unit indicated by the triggering operation; and in response to detecting a triggering operation on a first document identifier, opening the first document and jumping and displaying a first first reference text unit in the first document.

The first document may be displayed in response to the triggering operation on the first reference text unit. The first document is displayed by directly jumping to a position of the first reference text unit indicated by the triggering operation.

In this way, when the user expects to view the first reference text unit, the first reference text unit can be displayed quickly, thereby avoiding a process in which the user search the first document for the first reference text unit, and thus improving the efficiency of obtaining information by the user.

If the user triggers the first document identifier, the first document is opened, and the first document jumps and displays a first first reference text unit in the first document.

In this way, when the user expects to view the first document, the first document is opened, and the first first reference text unit in the first document is displayed. Therefore, the first document is opened from the target document according to the association between the first document and the target document, thereby improving the information obtaining efficiency of the user.

In some embodiments, the method further includes: displaying first document profile information in response to a selection operation on the first document information.

The selection operation on the first document information may be set depending on actual application scenarios. In an example, the selection operation may include any of a hover operation and a single click operation.

The first document profile information may be displayed in various manners. In an example, the first document profile information may be displayed by a thumbnail or a card.

It should be noted that, the first document profile information is displayed in response to the selection operation, so that the user conveniently obtains more related information of the first document, and obtains basis whether to further view the first document.

In some embodiments, the process of displaying the first document identifier may include: determining access permission information of a current user, and displaying the first document identifier matching the access permission to the current user.

The current user may be a current user displaying an application of the target document.

In an example, the target A may be the target document. Online documents referring to the document A may include a document C and a document D. It is assumed that a current user ZHANG San has an access permission of the document C and does not have an access permission of the document D. In this case, the first document identifier displayed at the current user ZHANG San may include the document C and does not include the document D.

It should be noted that, in the first document scenario, the first document of which the access permission is owned by the current user is displayed, and the first document of which the access permission is not owned by the current user is not displayed, so that an editor of the first document can manage the first document, thereby improving confidentiality of the first document.

In some embodiments, the process of displaying document information of the associated document of the target document includes: displaying a second document identifier.

The second document is a document referred to by the target document.

In some embodiments, the method further includes: determining a display mode of the second document identifier based on access permission information of the second associated document for a login account.

In an example, the second document may include a document B or a document E. It is assumed that the current user ZHANG San has an access permission of the document B, and does not have an access permission of the document E. In this case, identifiers of the document B and the document E may be displayed in different modes, to prompt the current user ZHANG San whether the two documents can be opened.

In some embodiments, the method further includes: in response to detecting a triggering operation on the second document identifier and in response to determining that the current user has an access permission, displaying a second document indicated by the triggering operation.

When the user triggers to display the second document, it may be detected whether the current user has the access permission of the second document. In a case that the current user has the access permission, the second document is displayed. Therefore, confidentiality of the second document can be improved.

In some embodiments, the method further includes: displaying a document relationship graph.

The document relationship graph is used to indicate a relationship between online documents in a preset document database.

The document relationship graph may include nodes and node relationship indication information. The node relationship indication information may indicate a relationship between online documents.

The document relationship graph may indicate the relationship between any online documents, including but not limited to the target document.

It should be noted that, the document relationship graph is displayed, so that the user can intuitively see the relationship between the documents, thereby overcoming the disadvantage of a conventional hierarchical structure. In addition, the user can find an unknown document of which an access permission is owned by the user, thereby promoting information exchange, and causing secondary interaction and sharing.

In some embodiments, the process of displaying a document relationship graph may include: in response to a triggering operation performed on the target document to display the document relationship graph, displaying a first local document relationship graph including the target document and the associated document.

It should be understood that nodes included in the document relationship graph may indicate many on-line documents. In actual application scenarios, the number of nodes displayed at one time is limited.

When the document relationship graph is triggered to display from an on-line document, the first local document relationship graph (that is, local of the document relationship graph) may be displayed. The local document relationship graph is centered around the target document, and may include the target document and an associated document of the target document.

The target document may be highlighted in the first local document relationship graph. Specific manners of the highlighting are not limited herein.

It should be noted that, the document relationship graph is triggered to display from the target document, the displayed first local document relationship graph includes the target document and the associated document of the target document, so that a position of the target document in the document relationship graph can be quickly displayed, thereby reducing an operation of searching for the target document by the user, improving the display efficiency, and reducing calculating resources and display resources consumed by the searching operation of the user.

In some embodiments, the method further includes: displaying a second local relationship graph. The second local relationship graph differs from the first local relationship graph in a display mode.

The second local relationship graph may include a document of which compactness of the association with the target document is lower than preset compactness.

In an embodiment, a document node having a compact reference relationship with the target document is highlighted, and a document node not having a compact reference relationship with the target document is displayed by gray/transparency.

In an embodiment, compactness of the reference relationship with the target document may be evaluated by reference degree.

For example, a direct reference relationship may be indicated by degree 1. An indicate reference relationship may be indicated by degree 2, degree 3 and so on, to indicate referring to the target document by how many layers.

For example, the associated document with a reference relationship degree not greater than 3 is determined as the associated document with a compact reference relationship, and is highlighted. The associated document with a reference relationship degree greater than 3 is determined as the associated document with a less compact reference relationship, and is displayed by gray.

It should be noted that, the second local relationship graph is displayed in a different mode from that of the first local relationship graph, so that the distinguished association of the target document is displayed to the user, and the user can quickly locate the target document and the associated document in the graph, thereby improving the intuitive of acquiring information by the user, that is, improving the efficiency of obtaining information by the user.

In some embodiments, the method further includes: indicating a reference relationship between the target document and the associated document by dynamic indication information. The dynamic indication information moves in a specific direction in a connection path between the target document and the associated document.

In an example, there is a dynamic effect for the connection lien between the nodes. A small cursor repeatedly moves from one node to another node in the connection line. The moving direction corresponds to referring/being referred relationships, and a direction corresponding to referring is opposite to a direction corresponding to being referred.

It should be noted that, the reference relationship is indicated by the dynamic indication information, so that the user can intuitively obtain the reference relationship between the target document and the associated document, thereby ensuring accuracy of the information obtained by the user.

In some embodiments, the document relationship indicated by the document relationship graph includes related documents. The method further includes: indicating correlation between nodes by a preset correlation indication mode.

The connection line may be a dashed line which indicates that the document is a recommended document rather than a document with a reference relationship.

In this way, multiple types of documents are presented in the document relationship graph, so that richer information is provided to the user, thereby simplifying the searching operation of the user and saving the calculating resources.

In some embodiments, the method further includes: displaying an upstream node and a downstream node of a selected node in a predefined mode.

A document indicated by the upstream node and the downstream node has a direct reference relationship and/or an indirect reference relationship with a document indicated by the selected node.

The selected node refers to a node in a selected state. For example, a hover operation or a single click operation may be performed at the node position, to cause the node to be at the selected state.

It should be noted that, the upstream node and the downstream node of the selected node are highlighted, so that a reference relationship of the selected node is presented to the user in a complex document relationship graph, thereby improving the efficiency of obtaining information from the document relationship graph by the user.

In some embodiments, the method further includes: in response to detecting a document searching operation, searching the displayed local document relationship graph for a node indicating a search document indicated by the document search operation; and in response to no node indicating the search document is found, displaying a search node indicating the search document and displaying a reference relationship of the search node.

For an online document which the user expects to view in the document relationship graph, the user may perform a document search operation. A search target may be referred to as a search document. If there is no node indicating the search document in the currently displayed local document relationship graph, the node may be loaded and rendered to display a node indicating the search document.

It should be noted that, the local document relationship graph is displayed, so that the user can quickly find a position of the search document to be displayed in the document relationship graph by searching, and thus determines the reference relationship of the search document, thereby improving a speed for obtaining related information of the document to be searched by the user, and improving the efficiency of obtaining information by the user.

Figure 2:
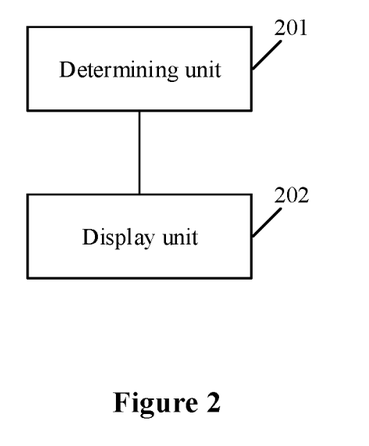
FIG. 2 is a schematic structural diagram of a document processing apparatus according to an embodiment of the present disclosure.

Referring to FIG. 2, a document processing apparatus is provided according to an embodiment of the present disclosure, to implement the method shown in FIG. 1. The apparatus embodiment corresponds to the method embodiment shown in FIG. 1. The apparatus may be applied to various electronic devices.

As shown in FIG. 2, the document processing apparatus according to the embodiment includes a determining unit 201 and a display unit 202. The determining unit is configured to determine a target document. The display unit is configured to display, based on an association between the target document and an associated document, document information of the associated document, where the document information of the associated document includes a first document having a first reference relationship with the target document, and/or a second document having a second reference relationship with the target document; the first reference relationship indicates that the associated document refers to the target document, and the second reference relationship indicates that target document refers to the associated document.

In the embodiment, for processing of the determining unit 201 and the display unit of the document processing apparatus and resulting technical effects, one may refer to related description of step 101 and step 102 in the embodiment corresponding to FIG. 1, and details are not repeated herein.

In some embodiments, the apparatus is further configured to: establish, in response to detecting a document reference operation, a reference relationship between the target document and the associated document; and add an associated document indicated by the established reference relationship in the document information of the associated document.

In some embodiments, the document reference operation includes at least one of: inputting a preset reference symbol and a name of a reference document; triggering a document insertion control and determining the reference document; inserting a link of the reference document; and inserting content of the reference document being referred to.

In some embodiments, the document information includes first sub-information and/or second sub-information, the first sub-information is used to display the first document, and the second sub-information is used to display the second document. The process of displaying, based on an association between the target document and an associated document, document information of the associated document includes: displaying a document identifier of an associated document in sub-information corresponding to the associated document, in response to that there is an associated document having a reference relationship with the target document; or displaying reference prompt information in corresponding sub-information, in response to that there is no associated document having a reference relationship with the target document.

In some embodiments, the apparatus is further configured to: delete, in response to determining that the association is canceled, a document identifier corresponding to the cancelled association from the document information.

In some embodiments, the apparatus is further configured to: update the document information in response to a content modification operation on the associated document.

In some embodiments, the process of updating the document information in response to a content modification operation on the associated document includes: updating a document identifier of the first document or the second document in the document information in response to a title modification operation on the first document or the second document.

In some embodiments, the apparatus is further configured to: update, in response to a modification operation on a first reference text unit of the first document, the first reference text unit in the document information, where the first reference text unit is a text unit in the first document referring to the target document.

In some embodiments, the apparatus is further configured to: display at least one of a comment amount and a reading amount of the associated document, where the comment amount includes at least one of a like amount and a word comment amount.

In some embodiments, the apparatus is further configured to: set an access permission of the target document for an access user of the first document, in response to a first permission control operation for the associated document.

In some embodiments, the apparatus is further configured to: apply for or set an access permission of the second document for an access user of the target document, in response to a second permission control operation for the associated document.

In some embodiments, the document information of the associated document includes a document identifier. The process of displaying, based on an association between the target document and an associated document, document information of the associated document includes: displaying a first document identifier. The first document is a document referring to the target document.

In some embodiments, the apparatus is further configured to: in response to detecting a triggering operation on the first document identifier, displaying the first document indicated by the triggering operation.

In some embodiments, the apparatus is further configured to: determine a display order of the first document identifier in the document information based on reference time.

In some embodiments, time when the association with the associated document is established first is used as the reference time, if the association is valid.

In some embodiments, the document information of the associated document includes a first reference text unit. The process of displaying, based on an association between the target document and an associated document, document information of the associated document includes: displaying a first reference text unit, where the first reference text unit is a text unit in the first document referring to the target document.

In some embodiments, the first document refers to the target document for multiple times, and the process of displaying a first reference text unit includes: determining a display order of the first reference text unit in the document information of the associated document, based on an order of the first reference text unit in the first document.

In some embodiments, the process of displaying the first reference text unit includes: determining the number of words in the first reference text unit according to a preset display word number threshold.

In some embodiments, the apparatus is further configured to perform at least one of the following operations: in response to detecting a triggering operation on the first reference text unit, opening the first document and jumping and displaying the first reference text unit indicated by the triggering operation; and in response to detecting a triggering operation on a first document identifier, opening the first document and jumping and displaying a first first reference text unit in the first document.

In some embodiments, the process of displaying a first document identifier includes: determining access permission information of a current user, and displaying the first document identifier matching the access permission information to the current user.

In some embodiments, the process of displaying document information of an associated document of the target document includes: displaying a second document identifier, where the second document is a document referred to by the target document.

In some embodiments, the apparatus is further configured to: determine a display mode of the second document identifier based on access permission information of a current user for the second associated document.

In some embodiments, the apparatus is further configured to: display the second document indicated by the triggering operation, in response to that a triggering operation on the second document identifier is detected and it is determined that a login user has an access permission.

In some embodiments, the apparatus is further configured to: display a document relationship graph, where the document relationship graph indicates a relationship between online documents in a preset document database.

In some embodiments, the process of displaying a document relationship graph includes: displaying a first local document relationship graph including the target document and the associated document, in response to a triggering operation performed on the target document to display the document relationship graph, where the target document is highlighted in the first local document relationship graph.

In some embodiments, the apparatus is further configured to: display a second local document relationship graph, where the second local document relationship graph differs from the first local document relationship graph in a display mode.

In some embodiments, the apparatus is further configured to: indicate a reference relationship between the target document and the associated document by dynamic indication information, where dynamic indication information moves in a specific direction in a connection path between the target document and the associated document.

In some embodiments, the apparatus is further configured to: display an upstream node and a downstream node of a selected node in a predefined mode, where a document indicated by the upstream node and the downstream node has a direct reference relationship and/or an indirect reference relationship with a document indicated by the selected node.

In some embodiments, the apparatus is further configured to: search, in response to detecting a document searching operation, the displayed local document relationship graph for a node indicating a search document indicated by the document searching operation; and display a searching node indicating the search document and display a reference relationship of the searching node if no node indicating the search document is found.

Figure 3:
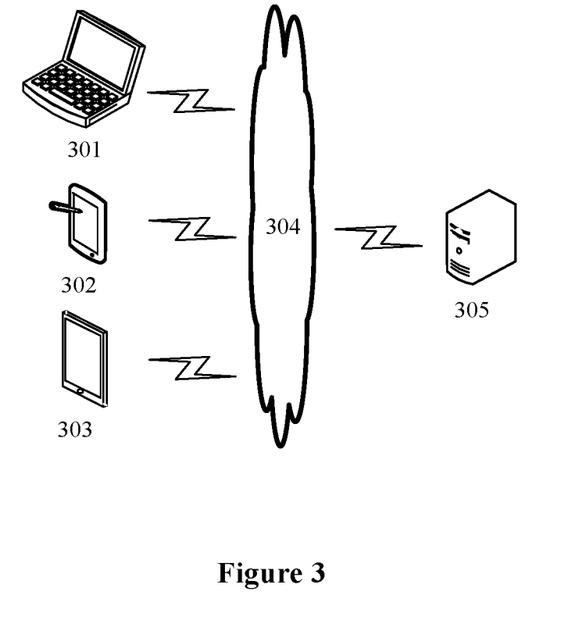
FIG. 3 shows an architecture of a schematic system to which the document processing method according to the embodiment of the present disclosure may be applied.

Reference is made to FIG. 3 which shows an architecture of a schematic system to which the document processing method according to the embodiment of the present disclosure may be applied.

As shown in FIG. 3, the system may include terminal devices 301, 302 and 303, a network 304 and a server 305. The network 304 is configured provide medium of a communication link between the terminal devices 301, 302, 303 and the server 305. The network 304 may include various connection types, such as wired communication link, wireless communication link or optical fiber.

The terminal device 301, 302 and 303 may interact with the server 305 over the network 304, to receive or transmit messages and so on. The terminal devices 301, 302 and 303 may be installed with various client applications, such as webpage browser application, search application and news application. The terminal devices 301, 302 and 303 may receive an instruction from the user, and perform corresponding functions in response to the instruction of the user, for example, adding corresponding information in the information according to the instruction of the user.

The terminal devices 301, 302 and 303 may be implemented by hardware or software. In a case that the terminal devices 301, 302 and 303 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 301, 302 and 303 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 305 may provide various services. For example, the server 305 is configured to receive an information acquisition request transmitted from the terminal devices 301, 302 and 303, acquire display information corresponding to the information acquisition request in various manners, and send data related to the display information to the terminal devices 301, 302 and 303.

It should be noted that, the document processing method described in the embodiments of the present disclosure may be performed by the terminal device. Accordingly, the document processing apparatus may be arranged in the terminal devices 301, 302 and 303. In addition, the document processing method described in the embodiments of the present disclosure may be performed by the server 305. Accordingly, the document processing apparatus may be arranged in the server 305.

It should be understood that the numbers of terminal device, network and server in FIG. 3 are only schematic. Any number of terminal device, network and server may be provided according to actual need.

Figure 4:
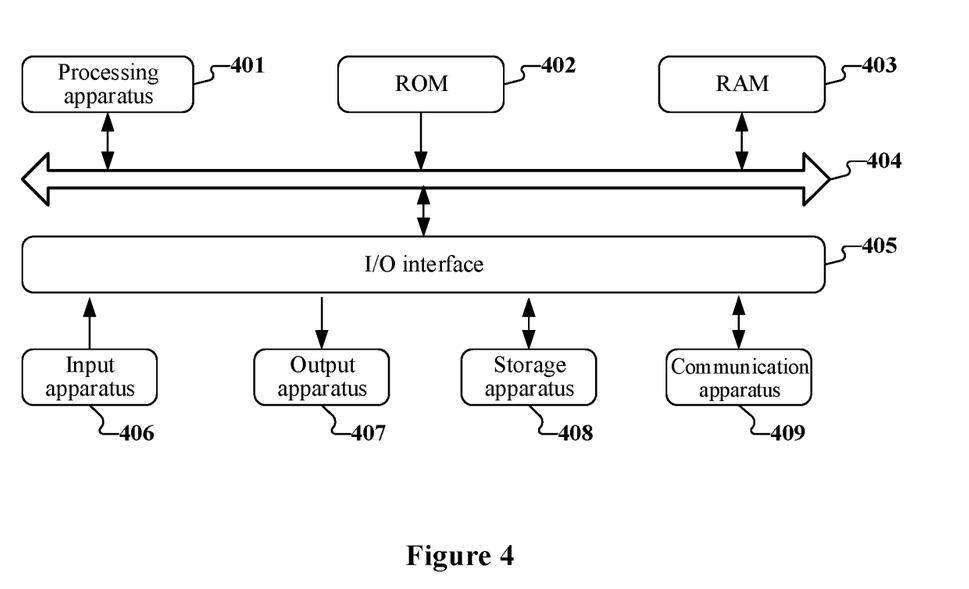
FIG. 4 is a schematic diagram of a basic structure of an electronic device according to an embodiment of the present disclosure.

Reference is made to FIG. 4 which shows a schematic structural diagram of an electronic device (for example a terminal device or a server shown in FIG. 3) for implementing the embodiment of the present disclosure. The terminal device in the embodiments of the present disclosure may include but not limited to: mobile terminals such as a mobile phone, a notebook computer, a digital broadcast receiver, a PDA (personal digital assistants), a PAD (tablet computer), a PMP (portable multimedia player), a vehicle-mounted terminal (for example a vehicle-mounted navigation terminal), and fixed terminals such as digital TV and a tablet computer. The electronic device shown in FIG. 4 is only schematic, and does not limit the functions and usage of the embodiments of the present disclosure.

As shown in FIG. 4, the electronic device may include a processing apparatus (such as a central processor and a graphic processor) 401. The processing apparatus may perform various appropriate actions and processing by executing programs stored in a read-only memory (ROM) 402 or programs uploaded from a storage apparatus 408 to a random access memory (RAM) 403. Various programs and data required for operations of the electronic device are also stored in the RAM 403. The processing apparatus 401, the ROM 402 and the RAM 403 are connected to each other through a bus 404. An input/output (I/O) interface 405 is also connected to the bus 404.

Generally, the following components are connected to the I/O interface 405: an input apparatus 406 such as a touch screen, a touch panel, a keyboard, a mouse, a camera, a microphone, an accelerometer, and gyroscope; an output apparatus 407 such as a liquid crystal display (LCD), a loudspeaker and a vibrator; a storage apparatus 408 such as a magnetic tape and a hard disk; and a communication apparatus 409. The communication apparatus 409 may allow the electronic device to communicate with other device in a wired or wireless manner to exchange data. Although FIG. 4 shows the electronic device including multiple apparatuses, it should be understood that not all shown apparatuses are necessary. Alternatively, more or less apparatuses may be included.

According to an embodiment of the present disclosure, a process described in the flowchart may be implemented by computer software programs. For example, according to an embodiment of the present disclosure, a computer program product including computer program carried on a computer readable medium is provided. The computer program includes program codes for performing the method shown in the flowchart. In such embodiment, the computer program may be downloaded and installed from the network through the communication apparatus 409, installed from the storage apparatus 408 or installed from the ROM 402. The computer program is executed by the processing apparatus 401 to perform functions defined in the method in the above embodiment of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the embodiments of the present disclosure, the computer readable storage medium may be a tangible medium including or storing programs. The programs may be used by an instruction execution system, apparatus or device, or may be used in combination with the instruction execution system, apparatus or device. In the embodiment of the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may communicate and connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. When the one or more programs are executed by the electronic device, the electronic device is instructed to perform the following operations: determining a target document; and displaying, based on an association between the target document and an associated document, document information of the associated document, where the document information of the associated document includes a first document having a first reference relationship with the target document, and/or a second document having a second reference relationship with the target document; the first reference relationship indicates that the associated document refers to the target document, and the second reference relationship indicates that that target document refers to the associated document.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the determining unit may be described as "a unit for determining a target document".

The functions described above may be partially performed by one or more hardware logic components. For example, the hardware logic components include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A document processing method, comprising:
   determining a target document;
   displaying, based on an association between the target document and an associated document, document information of the associated document, wherein the document information of the associated document comprises a first document having a first reference relationship with the target document, and/or a second document having a second reference relationship with the target document; the first reference relationship indicates that the associated document refers to the target document, and the second reference relationship indicates that the target document refers to the associated document;
   wherein the document information of the associated document comprises multiple first reference text units;
   wherein the displaying, based on an association between the target document and an associated document, document information of the associated document comprises:
   displaying the first reference text units, wherein first reference text unit is a text unit in the first document referring to the target document;

wherein the first document refers to the target document for a plurality of times, and the displaying the first reference text units comprises:
determining a display order of the first reference text units in the document information of the associated document, based on an order of the first reference text units in the first document.

2. The method according to claim 1, further comprising:
establishing, in response to detecting a document reference operation, a reference relationship between the target document and the associated document; and
adding an associated document indicated by the established reference relationship in the document information of the associated document.

3. The method according to claim 2, wherein the document reference operation comprises at least one of:
inputting a preset reference symbol and a name of a reference document;
triggering a document insertion control and determining the reference document;
inserting a link of the reference document; and
inserting content of the reference document being referred to.

4. The method according to claim 1, wherein the document information comprises first sub-information and/or second sub-information, the first sub-information comprises the first document, and the second sub-information comprises the second document;
wherein the displaying, based on an association between the target document and an associated document, document information of the associated document comprises:
displaying a document identifier of the associated document in sub-information corresponding to the associated document, in response to that there is an associated document having a reference relationship with the target document; or
the method further comprising:
displaying, based on an association between the target document and an associated document, reference prompt information in corresponding sub-information, in response to that there is no associated document having a reference relationship with the target document, if a first reference document exists but a second reference document does not exist, displaying the first sub-information including the first document, and displaying reference prompt information in the second sub-information, if the second reference document exists but the first reference document does not exist, displaying the second sub-information including the second document, and displaying reference prompt information in the first sub-information.

5. The method according to claim 1, further comprising:
deleting, in response to determining that the association is canceled, a document identifier corresponding to the cancelled association from the document information, or,
setting an access permission of the target document for an access user of the first document, in response to a first permission control operation on the associated document, or,
applying for or setting an access permission of the second document for an access user of the target document, in response to a second permission control operation on the associated document.

6. The method according to claim 1, further comprising:
updating the document information in response to a content modification operation on the associated document.

7. The method according to claim 6, wherein the updating the document information in response to a content modification operation on the associated document comprises:
updating a document identifier of the first document or the second document in the document information in response to a title modification operation on the first document or the second document.

8. The method according to claim 6, further comprising:
updating, in response to a modification operation on a first reference text unit of the first document, the first reference text unit in the document information, wherein the first reference text unit is a text unit in the first document referring to the target document.

9. The method according to claim 1, wherein the document information of the associated document comprises at least one first document identifier;
wherein the displaying, based on an association between the target document and an associated document, document information of the associated document comprises:
displaying the at least one first document identifier, wherein the first document is a document referring to the target document.

10. The method according to claim 9, further comprising:
displaying the first document in response to detecting a triggering operation on the first document identifier.

11. The method according to claim 9, further comprising:
determining a display order of multiple first document identifiers in the document information based on reference time.

12. The method according to claim 11, wherein time when the association with the associated document is established first is used as the reference time, if the association is valid, if there is a reference relationship between documents, the association is valid, if the reference relationship between documents is deleted, the association is invalid.

13. The method according to claim 9, wherein the displaying a first document identifier comprises:
determining access permission information of a current user, and displaying the first document identifier matching the access permission information to the current user.

14. The method according to claim 1, wherein the displaying document information of an associated document of the target document comprises:
displaying a second document identifier, wherein the second document is a document referred to by the target document.

15. The method according to claim 14, further comprising:
determining a display mode of the second document identifier based on access permission information of a current user for the second associated document, or,
displaying the second document indicated by the triggering operation, in response to that a triggering operation on the second document identifier is detected and it is determined that a login user has an access permission.

16. The method according to claim 1, further comprising:
displaying a document relationship graph, wherein the document relationship graph indicates a relationship between online documents in a preset document database.

17. The method according to claim 16, wherein the displaying a document relationship graph comprises:
  displaying a first local document relationship graph comprising the target document and the associated document, in response to a triggering operation performed on the target document to display the document relationship graph, wherein the target document is highlighted in the first local document relationship graph, wherein the method further comprising:
  displaying a second local document relationship graph, wherein the second local document relationship graph differs from the first local document relationship graph in a display mode.

18. The method according to claim 16, further comprising:
  indicating a reference relationship between the target document and the associated document by dynamic indication information, wherein the dynamic indication information moves in a specific direction in a connection path between the target document and the associated document, or,
  displaying an upstream node and a downstream node of a selected node in a predefined mode, wherein a document indicated by the upstream node and the downstream node has a direct reference relationship and/or an indirect reference relationship with a document indicated by the selected node, or,
  searching, in response to detecting a document searching operation, the displayed local document relationship graph for a node indicating a search document indicated by the document searching operation; and displaying a searching node indicating the search document and displaying a reference relationship of the searching node if no node indicating the search document is found.

19. An electronic device, comprising:
  at least one processor; and
  at least one memory communicatively coupled to the at least one processor and storing instructions that upon execution by the at least one processor cause the device to:
  determine a target document;
  display, based on an association between the target document and an associated document, document information of the associated document, wherein the document information of the associated document comprises a first document having a first reference relationship with the target document, and/or a second document having a second reference relationship with the target document; the first reference relationship indicates that the associated document refers to the target document, and the second reference relationship indicates that the target document refers to the associated document;
  wherein the document information of the associated document comprises multiple first reference text units;
  wherein the display, based on an association between the target document and an associated document, document information of the associated document comprises:
  display the first reference text units, wherein first reference text unit is a text unit in the first document referring to the target document;
  wherein the first document refers to the target document for a plurality of times, and the display the first reference text units comprises:
  determine a display order of the first reference text units in the document information of the associated document, based on an order of the first reference text units in the first document.

20. A computer readable non-transitory medium, bearing computer-readable instructions that upon execution on a computing device cause the computing device at least to:
  determine a target document;
  display, based on an association between the target document and an associated document, document information of the associated document, wherein the document information of the associated document comprises a first document having a first reference relationship with the target document, and/or a second document having a second reference relationship with the target document; the first reference relationship indicates that the associated document refers to the target document, and the second reference relationship indicates that the target document refers to the associated document;
  wherein the document information of the associated document comprises multiple first reference text units;
  wherein the display, based on an association between the target document and an associated document, document information of the associated document comprises:
  display the first reference text units, wherein first reference text unit is a text unit in the first document referring to the target document;
  wherein the first document refers to the target document for a plurality of times, and the display the first reference text units comprises:
  determine a display order of the first reference text units in the document information of the associated document, based on an order of the first reference text units in the first document.

* * * * *